United States Patent [19]

Fischer

[11] 4,094,223

[45] June 13, 1978

[54] MOUNTING DEVICE FOR USE IN MASONRY AND THE LIKE

[76] Inventor: Artur Fischer, Weinhalde 34, D-7244 Tumlingen, Waldachtal 3, Germany

[21] Appl. No.: 761,537

[22] Filed: Jan. 21, 1977

[30] Foreign Application Priority Data

Jan. 24, 1976 Germany ............................ 2602635

[51] Int. Cl.² .......................................... F16B 13/06
[52] U.S. Cl. ..................................................... 35/77
[58] Field of Search .................. 85/84, 83, 82, 77, 78, 85/74, 76, 70, 79, 75

[56] References Cited

U.S. PATENT DOCUMENTS 3,471,183   10/1969   Fischer ................................ 85/84 X

FOREIGN PATENT DOCUMENTS 737,206    6/1966   Canada .................................... 85/82
2,401,243  7/1975   Germany ................................. 85/77
886,118    1/1962   United Kingdom ..................... 85/84

*Primary Examiner*—Ramon S. Britts
*Attorney, Agent, or Firm*—Michael J. Striker

[57] ABSTRACT

A mounting device for use in masonry and the like comprises an expandable member adapted to be received in a hole of a structure and an expander member adapted to expand at least a leading end of the expandable member. A shaft member is provided which has a first portion located in the hole and connected to the expander member, and a second portion outwardly projecting from the hole towards an object to be mounted and adapted to carry the latter at a distance from the structure. A first sleeve-shaped element encloses the first portion and a section of the second portion of the shaft member over a length corresponding to a part of the distance between the structure and the object. A second sleeve-shaped element encloses another section of the second portion of the shaft member over a length corresponding to the remainder of the distance. The second sleeve-shaped element is adapted to support the object to be mounted and is mounted on the first sleeve-shaped element for turning movement relative thereto. The mounting device may also comprise a ring-shaped member located between the expandable element and the shaft member and connected with a front end portion of the first sleeve-shaped element.

11 Claims, 1 Drawing Figure

U.S. Patent
June 13, 1978
4,094,223
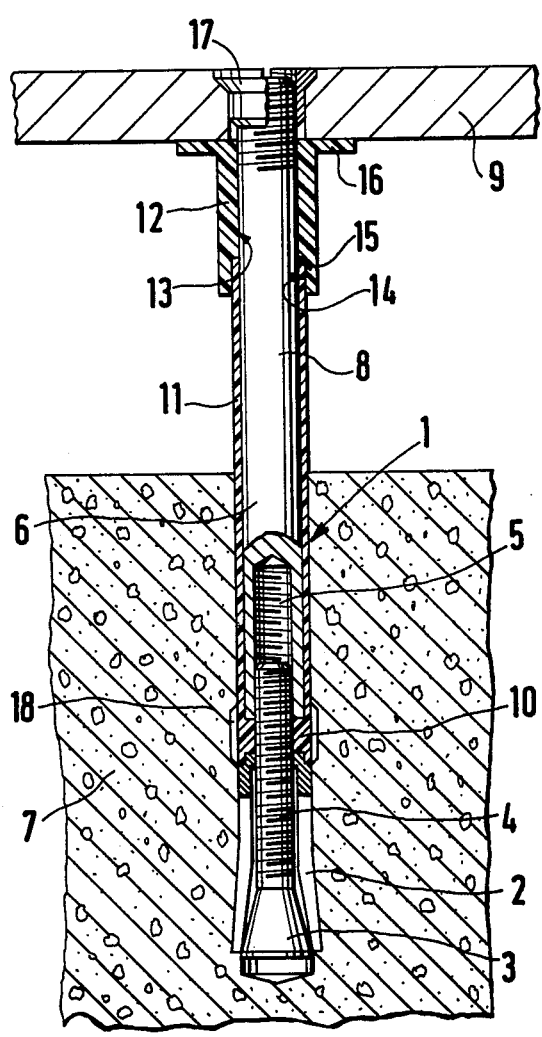

MOUNTING DEVICE FOR USE IN MASONRY AND THE LIKE

BACKGROUND OF THE INVENTION

The present invention relates generally to a mounting device, and particularly to a mounting device for use in masonry and the like.

Mounting devices are frequently used for mounting various objects such as, for instance, cladding panels, supporting elements and the like in masonry structures and other structures. The mounting devices have been proposed which comprise an expandable member adapted to be received in a hole of the structure expander member for expanding the expandable member, and a shaft member connected to the expander member and outwardly projecting from the hole of the structure so as to carry the object at a distance from the structure. In such devices a ring-shaped member of plastic material is provided, which is connected with a sleeve-shaped element enclosing an end portion of the shaft member. The trouble with this mounting device is that a length of the sleeve-shaped element is limited and therefore the remainder of the shaft extending between the sleeve-shaped element and the supported object is not protected from deleterious ambient conditions and is subjected to corrosion.

It has been further proposed to provide an additional sleeve-shaped element which overlaps the above-mentioned first sleeve-shaped element and encloses a portion of the shaft member not enclosed by the first sleeve-shaped element. This provides a sealing effect which, however, has been found to be insufficient in the cases when the objects are subjected to high forces and especially when such forces are exerted over a long period of time.

SUMMARY OF THE INVENTION

Accordingly, it is a general object of the present invention to avoid the disadvantages of the prior art mounting devices for use in masonry and the like. More particularly, it is an object of the present invention to provide an improved mounting device for use in masonry and the like the parts of which are more reliably protected against corrosion than the prior art devices.

Another object of the present invention is to provide an improved mounting device of the above-mentioned type which is reliably protected against corrosion especially in the cases when objects to be carried by the device are subjected to high forces exerted to the same during long time.

Still another object of the present invention is to provide an improved mounting device of the above mentioned type the parts of which are reliably protected in the cases when the objects are carried by the device at an essentially great distance from a structure.

In keeping with the above objects, and with others which will become apparent hereafter, one feature of the present invention resides in a mounting device for use in masonry and the like structures which, briefly stated, comprises an expandable member receivable in a hole of the structure, an expander member expanding at least a leading end of the expandable member, a shaft member having a first portion located in the hole and the second portion outwardly projecting from the same towards an object and adapte to carry the object at a distance from the structure, a first sleeve-shaped element enclosing the first portion and a second of the second portion of the shaft member at a length corresponding to a part of the distance, and a second sleeve-shaped element enclosing another section of the second portion of the shaft member over a length corresponding to the remainder of the distance, which second sleeve-shaped element is adapted to support the object and is mounted on the first sleeve-shaped element for turning movement relative thereto.

The device further comprises a ring-shaped member located between the expandable member and the shaft member and connected with a front end portion of the first sleeve-shaped element.

The second sleeve-shaped element has a central bore comprising a rear end part and a front end part of an enlarged diameter, and a shoulder between these two end parts. A rear end portion of the first sleeve-shaped element is received in the front end part of the central bore of the second sleeve-shaped element with abutment on the shoulder so as to permit turning of the sleeve-shaped elements relative to one another.

Advantageously, the second sleeve-shaped element is provided with a flange portion adapted to support the object to be mounted, which flange portion has a larger transverse dimension than that of the second sleeve-shaped element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is an axial section showing a device of the invention mounted in a support structure.

DESCRIPTION OF THE PREFERRED EMBODIMENT

Referring now to the single FIGURE of the drawing, it may be seen that a mounting device of the present invention is identified in toto by reference numeral 1. It comprises an expandable member 2 receivable in a hole of a structure 7 and an expander member having an expander portion 3 for expanding the expandable member 2. The expander portion 3 is of a shape diverging towards its leading end; and a trailing end of this portion 3 is connected to a threaded portion 4 having a diameter corresponding to the smallest diameter of the expander portion 3.

A shaft member comprises a first portion 6 located in the hole of the structure 7 and having an inner thread 5 threaded onto the thread portion 4 of the expander member. A second portion 8 of the shaft member is connected with the first portion 6 and projects outwardly from the hole of the structure 7. The second portion 8 of the shaft member serves to mount thereon an object such as a cladding plate 9.

A ring 10 is located between the expandable member 2 and the first portion 6 of the shaft member, and connected with a first sleeve 11. Sleeve 11 encloses the first portion 6 of the shaft member and outwardly projects from the hole of the structure 7 so as to enclose also a section of the second portion 8 of the shaft member at a length corresponding to a part of the distance between the structure 7 and the cladding plate 9. The ring 10 and the first sleeve 11 consist of a corrosion-resistant material.

A second sleeve 12 is provided which encloses another section of the second portion 8 of the shaft member at a distance corresponding to the remainder of the distance between the structure 7 and the cladding panel 9. The second sleeve 12 consists of a corrosion-resistant material and comprises a central bore 13 having a front part 14 of an enlarged diameter corresponding to the outer diameter of the second portion 8 of the shaft member. The second sleeve 12 has a shoulder 15 formed between the front part 14 and the remainder part of the central bore 13.

A rear end portion of the first sleeve 11 is received in the front part 14 of the bore 13 in the second sleeve 12 with a friction fit and abuts the shoulder 15 so that the second sleeve 12 can turn relative to the first sleeve 11 during mounting the cladding panel 9. A rear end section of the second sleeve 12 adapted to support the cladding panel 9 is provided with a flange portion 16, which flange portion 16 has a supporting surface exceeding a cross-section of the second sleeve 12 so as to further improve a supporting effect of the latter.

The cladding plate 9 is fixed to the shaft member by means, for instance, a steel flat head nut 17, which nut 17 is flush with an outer surface of the cladding plate 9.

Ribs 18 are provided on an outer circumference of the ring 10 preventing an undesirable rotation of the mounting device relative to the structure 7.

The first sleeve 11 reliably protects the parts of the mounting device located in the hole of the structure against corrosion, which parts in this case cannot contact with those deleterious media presenting in the structure 7 itself. The second sleeve 12 and the part of the first sleeve 11 projecting from the hole of the structure 7 assure a reliable protection of the parts of the mounting device located between the structure 7 and the object 9 to be mounted thereon against the corrosion due to contact with deleterious media presenting outside the structure.

Since the rear end portion of the first sleeve 11 is received in the bore 13 of the second sleeve 12 with a friction fit and about one shoulder 15, on the one hand the second sleeve 12 can turn relative to the first sleeve 11, and on the other hand the deleterious media cannot seep into an interior of the sleeves. Moreover, the rear end portion of the first sleeve 11 is supported by the second sleeve 12 so as to prevent folding of the former, and the second sleeve efficiently supports the object 9.

The thus constructed mounting device is reliably protected against corrosion even in the cases when the mounted object is subjected to high forces exerted during long time, and also when the object is mounted at a long distance from the structure.

It will be understood that each of the elements described above, or two or more together, may also find a useful application in other types of constructions differing from the types described above.

While the invention has been illustrated and described as embodied in a mounting device for use in masonry and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mounting device in combination with a masonry structure and the like, comprising an expandable member received in a hole of said structure; an expander member adapted to expand at least a leading end of said expandable member; a shaft member having a first portion located in said hole and connected with said expander member, and a second portion outwardly projecting from said hole in a first direction from said structure towards an object being mounted and carrying said object at a distance from said structure; and a sleeve-shaped element of a corrosion-resistant material enclosing said first portion of said shaft member located in said hole and also enclosing said second portion of said shaft member outwardly projecting from said hole over a length corresponding to said distance, said sleeve-shaped element having a section abutting against said object to keep it at said distance from said structure.

2. A mounting device as defined in claim 1, wherein said sleeve-shaped element includes a first sleeve member enclosing said first portion of said shaft member and one section of said second portion thereof adjacent said first portion over a length corresponding to a part of said distance, and a second sleeve member enclosing another section of said second portion of said shaft member over a length corresponding to the remainder of said distance, said abutting section being arranged on said second sleeve member.

3. A combination as defined in claim 2, and further comprising a ring-shaped member located between said expandable member and said shaft member; said first sleeve member having a front end portion located in said hole and a rear end portion spaced from said front end portion in said first direction, said front end portion of said first sleeve member being fixedly connected with said ring-shaped member.

4. A device as defined in claim 2, wherein said first sleeve member has a front end portion located in said hole and a rear end portion spaced from said front end portion in said first direction, said second sleeve member having a front end section facing said structure and a rear end section spaced from said front end section in said first direction and adapted to support said object, said rear end portion of said first sleeve member being turnably connected to said front end section of said second sleeve member.

5. A device as defined in claim 4, wherein said second sleeve member is provided with a central bore having a first part adjacent said rear end section of said second sleeve member and a second part adjacent said front end section and being of a dimension in a second direction transverse to said first direction exceeding the respective dimension of said first part of said central bore, said rear end portion of said first sleeve member being received in said second part of said central bore of said second sleeve member with a friction fit.

6. A device as defined in claim 5, wherein the dimension of said second part of said central bore of said second sleeve member in said second direction substantially corresponds to the outer dimension of said rear end portion of said first sleeve member in said second direction.

7. A device as defined in claim 5, wherein said second sleeve member has a shoulder located between said first and said second part of said bore and extending substantially in said second direction, said rear end portion of said first sleeve member having a rear end face facing said object and abutting said shoulder so as to permit turning of said first and second sleeve member relative to one another.

8. A device as defined in claim 2, wherein said second sleeve member has a front end section facing said structure and a rear end section spaced from said front end section in said first direction, said rear end section of said second sleeve member being provided with said abutting section.

9. A device as defined in claim 8, wherein said abutting section is a flange portion having a supporting surface extending in a second direction substantially transverse to said first direction and adapted to abut against said object to be mounted, said supporting surface being in said second direction of a dimension exceeding the cross-section of said rear end section of said second sleeve member.

10. A device as defined in claim 8, wherein said flange portion is of one piece with said second sleeve member.

11. A mounting device in combination with a masonry structure and the like, comprising, an expandable member received and anchored in a hole of said structure; an expander member for expanding at least a leading end of said expandable member; a shaft member having a first portion located in said hole and connected with said expander member, and a second portion outwardly projecting from said hole in a first direction from said structure towards an object being mounted and carrying said object at a distance from said structure; a ring-shaped member located between said expandable member and said shaft member; and a sleeve-shaped element of a corrosion-resistant material including a first sleeve member, a second sleeve member and a flange portion, said first sleeve member enclosing said first portion of said shaft member and one section of said second portion thereof adjacent said first portion over a length corresponding to a part of said distance, said first sleeve member having a front end portion located in said hole and a rear end portion spaced from said front end portion in said first direction and having a rear end face facing said object, said ring-shaped member being fixedly connected to said front end portion of said first sleeve member, said second sleeve member enclosing another section of said second portion of said shaft member over a length corresponding to the remainder of said distance, said second sleeve member having a front end section facing said structure and a rear end section spaced from said front end section in said first direction, said second sleeve member being provided with a central bore having a first part adjacent said rear end section and a second part adjacent said front end section, said second part of said central bore being of a dimension in a second direction transverse to said first direction exceeding the respective dimension of said first part of said bore and corresponding to the outer dimension of said rear end portion of said first sleeve member, said second sleeve member having a shoulder located between said first and said second part of said central bore and extending substantially in said second direction, said rear end portion of said first sleeve member being received in said second part of said central bore of said second sleeve member with a friction fit and said rear end of said rear end portion of said first sleeve member abutting said shoulder of said second sleeve member so as to permit turning of said first and second sleeve members relative to one another, said flange portion being connected to said rear end section of said second sleeve member and having a surface extending in said second direction and abutting against said object to keep it at said distance from said structure, said abutting surface being in said second direction of a dimension exceeding the cross-section of said rear end section of said second sleeve member.

* * * * *